United States Patent
Plume et al.

(10) Patent No.: US 6,846,863 B2
(45) Date of Patent: Jan. 25, 2005

(54) POLYETHYLENE COMPOSITION AND METHOD FOR MAKING SHAPED OBJECTS FROM SAME

(75) Inventors: Denis Plume, Brussels (BE); Pascal Vanden Berghe, Limal (BE)

(73) Assignee: Solvay Polyolefins Europe-Belgium (S.A.), Brussels (BE)

(*) Notice: Subject to any disclaimer, the term of this patent is extended or adjusted under 35 U.S.C. 154(b) by 31 days.

(21) Appl. No.: 10/221,182

(22) PCT Filed: Mar. 15, 2001

(86) PCT No.: PCT/EP01/02968

§ 371 (c)(1),
(2), (4) Date: Dec. 18, 2002

(87) PCT Pub. No.: WO01/70872

PCT Pub. Date: Sep. 27, 2001

(65) Prior Publication Data

US 2003/0105198 A1 Jun. 5, 2003

(30) Foreign Application Priority Data

Mar. 22, 2000 (EP) ............................................. 00201031

(51) Int. Cl.⁷ ................................................. B65B 3/00
(52) U.S. Cl. ........................ 524/211; 524/229; 524/323; 524/275; 524/279; 524/488; 524/490
(58) Field of Search .................................. 524/229, 211, 524/232, 279, 487, 488, 275, 490, 210, 228, 230, 227

(56) References Cited

U.S. PATENT DOCUMENTS

| 4,454,272 A | * | 6/1984 | McKinney et al. | .......... 524/241 |
| 4,701,487 A | * | 10/1987 | Hakim | .................. 524/229 |
| 4,764,326 A | | 8/1988 | Hakim | |
| 6,465,066 B1 | | 10/2002 | Rule et al. | |

FOREIGN PATENT DOCUMENTS

| EP | 0 305 116 | 3/1989 |
| EP | 0 310 092 | 4/1989 |
| EP | 0 687 706 | 12/1995 |
| GB | 792 009 | 3/1958 |

* cited by examiner

Primary Examiner—Robert D. Harlan
(74) Attorney, Agent, or Firm—Oblon, Spivak, McClelland, Maier & Neustadt, P.C.

(57) ABSTRACT

The invention concerns a polyethylene based composition comprising 0.05 to 0.5 wt. % of at least a saturated fatty acid amide containing 8 to 30 carbon atoms, 0 to 0.1 wt. % of an auxiliary lubricant selected among fatty acids, fatty acid esters, fatty acid salts, monounsaturated fatty acid amides, polyols containing at least 4 carbon atoms, monoalcohol or polyalcohol monoethers, glycerol esters, paraffins, polysiloxanes, fluorinated polymers and mixtures thereof, and 0 to 5 wt. % of one or more additives selected among the antioxidants, anti-acids, anti-UV stabilizers, coloring agents and antistatic agents.

12 Claims, No Drawings

POLYETHYLENE COMPOSITION AND METHOD FOR MAKING SHAPED OBJECTS FROM SAME

The invention relates to a composition based on polyethylene. It also relates to a method for producing shaped items, in particular a method for producing screw caps for bottles from this composition.

It is generally known that caps for bottles can be produced from polyethylene. To optimize slip properties and to facilitate unscrewing of the cap, incorporating a lubricant into the polyethylene is also known. U.S. Pat. No. 5,948,846 describes the use of a composition comprising 13-docosenamide as a lubricant for producing caps. However, that composition has the disadvantage of causing a bad odor and bad flavor in foodstuffs stored in contact with caps based on that composition. That problem has been solved by adding a quantity of a particular zeolite to the compositions to act as a flavor and odor trap.

A composition has now been discovered that does not suffer from the disadvantages cited above, without the need for a flavor and odor trap such as a zeolite, and which provides good slip properties.

To this end, the invention concerns a composition constituted by at least 94.5% by weight of polyethylene with a standard density of more than 940 kg/m$^3$, 0.05 to 0.5% by weight of at least one saturated fatty acid amide containing 8 to 30 carbon atoms, 0 to 0.15% by weight of a subsidiary lubricant selected from fatty acids, fatty acid esters, fatty acid salts, mono-unsaturated fatty acid amides, polyols containing at least 4 carbon atoms, mono- or poly-alcohol monoethers, glycerol esters, paraffins, polysiloxanes, fluoropolymers and mixtures thereof, and 0 to 5% by weight of one or more additives selected from antioxidants, UV stabilizers, antacids, colorants and antistatic agents.

The term "polyethylene" means ethylene homopolymers and copolymers of ethylene with one or more comonomers, and mixtures thereof. The comonomers are normally α-olefins containing 3 to 12 carbon atoms. Preferred comonomers are 1-butene and 1-hexene; 1-butene is particularly preferred. In general, the quantity of comonomer in the copolymer is at least 0.01 mol %, in particular at least 0.05 mol %, quantities of at least 0.15 mol % being the most advantageous. The quantity of comonomer is normally a maximum of 5 mol %, more precisely a maximum of 3 mol %, quantities of at most 1 mol % being recommended. Particularly effective results are obtained with quantities of comonomer of 0.1 to 0.7 mol %.

The polyethylene employed in the present invention has a standard density (SD) of more than 940 kg/m$^3$. Within the context of the present invention, the SD is measured in accordance with ISO 1183-3 (1999). It is preferably at least 948 kg/m$^3$. In general, the SD does not exceed 960 kg/m$^3$.

Most frequently, the polyethylene is also characterized by a melt index (MI$_2$), measured at 190° C. under a load of 2.16 kg in accordance with ASTM D 1238 (1998), of at least 0.05 g/10 min, in particular at least 0.1 g/10 min; values of at least 0.2 g/10 min are the most usual. The melt index generally does not exceed 10 g/10 min, preferably not exceeding 8 g/10 min; values of at most 5 g/10 min are recommended. Melt indices of 1 to 3 g/10 min, for example about 2 g/10 min, are preferred.

The composition of the invention comprises at least one saturated fatty acid amide containing 8 to 30 carbon atoms. The saturated fatty acid amides are preferably linear fatty acid amides represented by the formula $CH_3(CH_2)_nCONH_2$ in which n=6 to 28. Linear saturated fatty acid amides containing at least 12 carbon atoms and mixtures thereof are recommended. Behenamide is particularly preferred.

The saturated fatty acid amide content in the composition in accordance with the invention is preferably at least 0.07% by weight, more particularly at least 0.08% by weight. In general, this amount does not exceed 0.4% by weight. Preferably, this amount does not exceed 0.35% by weight.

In addition to the polyethylene and saturated fatty acid amide, the composition of the invention can also contain 0 to 0.15% by weight of a subsidiary lubricant selected from fatty acids, fatty acid esters, fatty acid salts, mono-unsaturated fatty acid amides, polyols containing at least 4 carbon atoms, mono- or poly-alcohol monoethers, glycerol esters, paraffins, polysiloxanes, fluoropolymers and mixtures thereof. When the subsidiary lubricant is selected from mono-unsaturated fatty acid amides, then mono-unsaturated fatty acid amides containing 8 to 30 carbon atoms represented by the formula $CH_3(CH_2)_xCH=CH(CH_2)_yCONH_2$ in which (x+y)=4 to 26 are preferred; mono-unsaturated fatty acid amides containing at least 12 carbon atoms and mixtures thereof are particularly preferred. Good results are obtained with erucamide.

The subsidiary lubricant content does not exceed 0.15% by weight. Preferably, this content does not exceed 0.1% by weight. In a variation, the composition of the invention is free of subsidiary lubricant as defined above.

The composition of the invention can contain the usual additives such as antioxidants, antacids, UV stabilizers, colorants and antistatic agents. The total additives content does not exceed 5% by weight; it is preferably less than 4% by weight.

The antioxidants used in the composition of the invention are generally selected from hindered phenol, phosphite or phosphonite type antioxidants and mixtures thereof.

Hindered phenol type antioxidants can be selected from phenols substituted in the ortho position, 2,6-dialkylphenols, bisphenols, beta-(3,5-di-t-butyl-4-hydroxyphenyl) propionic acid amides and esters of beta-(3,5-di-t-butyl-4-hydroxyphenyl) propionic acid with mono- or poly-valent alcohols. Examples of hindered phenol type antioxidants are 2,6-di-t-butylparacresol, 3,5-trimethyl-2,4,6-tris(3,5-di-t-butyl-4-hydroxy-benzyl) benzene [sic], tris(3,5-di-t-butyl-4-hydroxy-benzyl) isocyanurate, stearyl beta-(3,5-di-t-butyl-4-hydroxybenzyl) propionate, 2,6-di-t-butyl-4-methylphenol, pentaerithrityl tetrakis(3,5-di-t-butyl-4-hydroxyphenyl) propionate, bis(beta-3,5-di-t-butyl-4-hydroxyphenylethyl) suberate and N,N'-bis((3-(3',5'-di-t-butyl-4'-hydroxyphenyl) propionyl))-hexamethylenediamine.

Phosphite type antioxidants are generally selected from alkyl- and arylphosphites, and more particularly from symmetrical triarylphosphites. Examples of phosphite type antioxidants are tris-(2,4-di-t-butylphenyl) phosphite, tris-(2-t-butyl-4-methylphenyl) phosphite, tris-p-nonylphenylphosphite, tris(2,4-dinonylphenyl) phosphate and bis(2,4-di-t-butyl) pentaerythritol diphosphite, distearyl pentaerythritol diphosphite, bis(2,4-dicumylphenyl) pentaerythritol diphosphite. The use of tris(2,4-di-t-butylphenyl) phosphite is most particularly recommended.

Phosphonite type antioxidants can be selected from arylphosphonites, diphosphonites, and more particularly from aryldiphosphonites. An example of a phosphonite type antioxidant is tetrakis [2,4-di-t-butylphenyl]-4,4'-biphenylenediphosphonite.

Good results are obtained when the composition comprises at least 0.01% by weight of antioxidants. The antioxidants content does not generally exceed 1.5% by weight.

Preferably, the composition comprises 0.02% to 0.5% by weight of antioxidants.

The antacids employed in the composition of the invention can be selected from fatty acid salts (such as sodium, calcium or zinc stearate), hydrotalcites, metal oxides (such as magnesium, calcium or zinc oxides) and mixtures thereof. Calcium stearate is preferred. The antacid content is preferably less than 3% by weight. It is more preferably less than 1% by weight.

The UV stabilizers employed in the composition of the invention can be selected from 2-(2'-hydroxyphenyl)-benzotriazoles, 2-hydroxybenzophenones, hindered amines and mixtures thereof. Examples of 2-(2'-hydroxyphenyl)-benzotriazoles are 2-(2'-hydroxy-3',5'-di-t-butylphenyl)-5-chlorobenzotriazole and 2-(2'-hydroxy-3'-t-butyl-5'-methylphenyl)-5-chlorobenzotriazole, 2-(2'-hydroxy-3',5'-di-t-amylphenyl)-benzotriazole. An example of a 2-hydroxybenzophenone is 2-hydroxy-4-n-octoxy-benzophenone. Examples of hindered amines are bis(2,2,6,6-tetramethyl-4-piperidyl) sebacate, and the polycondensate of succinic acid and 1-(2-hydroxyethyl)-2,2,6,6-tetramethyl-4-hydroxypiperidine. The UV stabilizer content is preferably less than 1% by weight. It is more preferably less than 0.5% by weight.

The colorants employed in the composition of the invention can be selected from organic colorants (such as phthalocyanines, anthraquinones, mono- and di-azo compounds, diazines, quinacridones and indigos) and inorganic colorants (for example metal oxides and salts).

Generally, the colorant content does not exceed 4% by weight. Preferably, they do not exceed 3.5% by weight in content.

The antistatic agents employed in the composition in accordance with the invention can be selected from cationic compounds (such as quaternary ammonium salts), anionic compounds (such as alkylsulfonates, alkylsulfates, alkylphosphates, dithiocarbamates, or alkali or alkaline-earth metal carboxylates), nonionic compounds (such as polyethylene glycol esters and ethers, fatty acid esters, ethoxylated alkylamines, mono- and di-glycerides, ethoxylated fatty acids and their mixtures) and mixtures thereof. Nonionic compounds are preferred. The antistatic agent content is preferably less than 3% by weight. More preferably, it is less than 1% by weight.

The composition of the invention is free of zeolites. It contains no glycerine.

The composition of the invention can be obtained using any suitable known means. As an example, two successive steps can be carried out, the first consisting of mixing the polyethylene, the saturated fatty acid amide and optional subsidiary lubricant and one or more additives at ambient temperature, the second step consisting of continuing mixing in the melt in an extruder. The temperature of the second step is generally 100 to 300° C., in particular 120 to 250° C., and more particularly about 130 to 210° C. An alternative method consists of introducing the saturated fatty acid amide and possibly the other compounds into the already molten polyethylene.

It is also possible to first prepare a masterbatch comprising a first fraction of the polyethylene, the saturated fatty acid amide and optional subsidiary lubricant and other additives, this masterbatch being rich in saturated fatty acid amide and optionally in other compounds. This masterbatch is then mixed with the remaining fraction of the polyethylene, for example during production of granules of the composition.

The composition of the invention has both good slip properties, which render it suitable for use in producing screw caps for bottles, and good organoleptic properties, which render it usable in food applications.

The composition of the invention can appropriately be used in any conventional method for producing shaped items from polyethylene, more particularly the processes of extrusion, extrusion-blow molding, extrusion-thermoforming and injection molding. Particularly satisfactory results are obtained when producing shaped items by injection molding, particularly of screw caps for bottles.

Consequently, the present invention also concerns a method for producing shaped items from the composition according to the invention, in particular a method for producing bottle caps, by injection molding this composition. In accordance with this method, said composition, generally in the form of granules, is introduced into an extruder in which it is melted using a plasticizing unit. Good results are obtained with single-screw extruders. The barrel and the screw temperatures are generally in the range 100° C. to 300° C., particularly in the range 130° C. to 270° C., more particularly in the range 200° C. to 250° C. During the plasticizing phase, the composition of the invention in the molten state accumulates in front of the screw tip. Then it is rapidly injected into a chilled mold. Directly after this filling phase, the composition is held under pressure to compensate for shrinkage. After cooling briefly, the shaped items are ejected as the mold is opened. Caps produced by this method are suitable for use in closing bottles, more particularly for bottles containing foodstuffs.

The examples described below serve to illustrate the invention.

Example 3 is given by way of comparison. The meanings of the symbols used in these examples, the units expressing the parameters mentioned and the methods for measuring these parameters are explained below.

$MI_2$=melt index of the polyethylene, expressed in g/10 min, measured at 190° C. under a load of 2.16 kg in accordance with ASTM D 1238 (1998);

SD=standard density of the polyethylene, expressed in $kg/m^3$, measured in accordance with ISO 1183-3 (1999);

OT=opening torque, measured using the following method:
Ten caps are screwed onto 33 cl glass bottles using a single-head Zalkin laboratory machine to close the caps with a constant angle of rotation of 540°, corresponding to 1.5 turns. The opening torque is measured. The OT value is the mean value obtained for the ten caps. This test is carried out 1 week ($OT_1$) and 3 weeks ($OT_3$) after producing the caps.

OI=organoleptic index, measured as follows:
33 g of the polyethylene-based composition in the form of granules are suspended in 1 l of water for 4 hours at 60° C. 6 different operatives then taste the water of the suspension, which is cooled to ambient temperature, and assess its flavor. They each award a grade from 1 to 4 as compared with a sample of water that has undergone the same treatment in the absence of granules or flakes, a grade of 1 corresponding to the flavor of that sample of water. A high grade corresponds to a bad flavor. The organoleptic index (OI) is the average of the grades from 6 operatives.

OIS=organoleptic index after exposure to the sun, measured as follows:
33 cl glass bottles are filled with water and provided with injected caps 1 week in advance. These bottles are exposed to the solar spectrum for 42 hours at 40° C. at 550 watts/$m^2$ in a Sun Test apparatus. The flavor of the water is then tested using the method described for determining the OI.

EXAMPLE 1

In Accordance with the Invention

A composition constituted as follows was mixed (at 190° C.) and granulated in an extruder:

- 99.4 parts by weight of polyethylene (containing about 0.4 mol % of 1-butene) characterized by an $MI_2$ of 1.9 g/10 min and an SD of 952 kg/m$^3$;
- 0.2 parts by weight of antacid agent (calcium stearate);
- 0.1 parts by weight of antioxidant [tris(2,4-di-t-butylphenyl) phosphate];
- 0.1 parts by weight of UV stabilizer [polycondensate of succinic acid and 1-(2-hydroxyethyl)-2,2,6,6-tetramethyl-4-hydroxypiperidine];
- 0.2 parts by weight of behenamide (docosonamide).

The OI of the granules was 1.3.

Screw caps were produced by injection molding using a Netstal machine provided with an 18-cavity mold.

The caps obtained from the composition had an $OT_1$ of 1.98 Nm and an $OT_3$ of 1.47 Nm. The OIS measured for the caps was 1.7.

EXAMPLE 2

In Accordance with the Invention

The operations of Example 1 were repeated, replacing the 0.2 parts by weight of behenamide with a mixture of 0.08 parts by weight of erucamide (13-docosenamide) and 0.12 parts by weight of behenamide.

The OI of the granules was 2.0.

The screw caps obtained from the composition had an $OT_1$ of 2.1 Nm and an $OT_3$ of 1.70 Nm. The OIS measured for the caps was 2.2.

EXAMPLE 3

By Way of Comparison

The operations of Example 1 were repeated, replacing the 0.2 parts by weight of behenamide with 0.2 parts by weight of erucamide (13-docosenamide).

The OI of the granules was 2.7.

The screw caps obtained from the composition had an $OT_1$ of 1.64 Nm and an $OT_3$ of 0.96 Nm. The OIS measured for the caps was 2.7.

A comparison of the results of Example 3 with those of Examples 1 and 2 demonstrates the improvement provided by the invention as regards the organoleptic properties.

What is claimed is:

1. Composition comprising at least 94.5% by weight of a polyethylene with a standard density of more than 940 kg/m$^3$, 0.05 to 0.5% by weight of at least one saturated fatty acid amide represented by $CH_3(CH_2)_nCONH_2$ in which n ranges from 6 to 28 0 to 0.15% by weight of a subsidiary lubricant selected from fatty acids, fatty acid esters, fatty acid salts, mono-unsaturated fatty acid amides, polyols containing at least 4 carbon atoms, mono- or poly-alcohol monoethers, glycerol esters, paraffins, polysiloxanes, fluoropolymers and mixtures thereof, and 0 to 5% by weight of one or more additives selected from antioxidants, antacids, UV stabilizers, colorants and antistatic agents.

2. Composition according to claim 1, in which the saturated fatty acid amide is selected from linear saturated fatty acid amides containing at least 12 carbon atoms, and mixtures thereof.

3. Composition according to claim 2, in which the saturated fatty acid amide is behenamide.

4. Composition according to claim 1, wherein the saturated fatty acid amide content is at least 0.07% by weight, and does not exceed 0.4% by weight.

5. Composition according to claim 1, in which the polyethylene has a standard density of 948 to 960 kg/m$^3$.

6. Composition according to claim 1, in which the polyethylene has a melt index $MI_2$ of at least 0.05 g/10 min and which does not exceed 10 g/10 min.

7. Composition according to claim 1, in which the antioxidant content is at least 0.01% by weight.

8. Composition according to claim 1, in which the subsidiary lubricant is selected from mono-unsaturated fatty acid amides containing 8 to 30 carbon atoms.

9. Composition according to claim 1, wherein the subsidiary lubricant content does not exceed 0.1% by weight.

10. Composition according to claim 1, which is free of subsidiary lubricant.

11. Method for producing shaped items from a polyethylene-based composition according to claim 1.

12. Method according to claim 11, applied to the production of bottle caps by injection molding.

* * * * *